US009851450B2

(12) United States Patent
Vilppula et al.

(10) Patent No.: US 9,851,450 B2
(45) Date of Patent: *Dec. 26, 2017

(54) PORTABLE TERMINAL AND METHOD FOR POSITION DETERMINATION

(71) Applicant: Nokia Technologies Oy, Espoo (FI)

(72) Inventors: Matti Vilppula, Lempäälä (FI); Arto Mattila, Lempäälä (FI); Markku T. Niemi, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,629

(22) Filed: Aug. 4, 2017

(65) Prior Publication Data
US 2017/0329018 A1 Nov. 16, 2017

Related U.S. Application Data

(63) Continuation of application No. 15/095,961, filed on Apr. 11, 2016, which is a continuation of application
(Continued)

(30) Foreign Application Priority Data

Jun. 30, 2000 (FI) ..................................... 20001576

(51) Int. Cl.
G01S 19/48 (2010.01)
H04W 4/00 (2009.01)
(Continued)

(52) U.S. Cl.
CPC ............ *G01S 19/48* (2013.01); *G01S 5/0263* (2013.01); *H04W 4/008* (2013.01); *H04W 4/02* (2013.01);
(Continued)

(58) Field of Classification Search
CPC ...... G01S 18/48; G01S 5/0263; H04W 4/008; H04W 4/02; H04W 84/042; H04W 84/12; H04W 88/02
(Continued)

(56) References Cited

U.S. PATENT DOCUMENTS 4,139,837 A   2/1979   Liljenwall et al.
5,117,201 A   5/1992   Luther
(Continued)

FOREIGN PATENT DOCUMENTS

CA   2414604 A1   1/2002
CN   1190183 A    8/1998
(Continued)

OTHER PUBLICATIONS

Intel, "Intel PXA27x Processor Family Developer's Manual", Apr. 2004, 67 Pages.
(Continued)

*Primary Examiner* — Marisol Figueroa
(74) *Attorney, Agent, or Firm* — Ditthavong & Steiner, P.C.

(57) ABSTRACT

There is a mobile terminal including an antenna, a Global Positioning System (GPS) receiver and at least two different applications. Each of the at least two different applications are executable on the mobile terminal. The mobile terminal is configured to wirelessly transmit information to and wirelessly receive information from a mobile communication network. The mobile terminal is further configured to use positioning data from a plurality of positioning methods including at least a GPS method and a Wireless Local Area Network (WLAN) positioning method. The mobile terminal also includes at least one processor and at least one memory including computer program code configured to, with the at least one processor, cause the mobile terminal to receive
(Continued)

positioning data associated with at least two of the plurality of positioning methods. The mobile terminal centrally manages, processes a request for, combines and makes available positioning data.

30 Claims, 8 Drawing Sheets

Related U.S. Application Data

No. 14/982,219, filed on Dec. 29, 2015, which is a continuation of application No. 14/801,275, filed on Jul. 16, 2015, now Pat. No. 9,392,403, which is a continuation of application No. 12/476,378, filed on Jun. 2, 2009, now abandoned, which is a continuation of application No. 09/897,004, filed on Jul. 2, 2001, now Pat. No. 7,558,696.

(51) Int. Cl.
| | |
|---|---|
| H04W 4/02 | (2009.01) |
| G01S 5/02 | (2010.01) |
| H04W 28/18 | (2009.01) |
| H04W 84/04 | (2009.01) |
| H04W 84/12 | (2009.01) |
| H04W 88/02 | (2009.01) |

(52) U.S. Cl.
CPC .......... H04W 28/18 (2013.01); H04W 84/042 (2013.01); H04W 84/12 (2013.01); H04W 88/02 (2013.01)

(58) Field of Classification Search
USPC .............................................. 455/456.1–457
See application file for complete search history.

(56) References Cited

U.S. PATENT DOCUMENTS

| | | |
|---|---|---|
| 5,208,763 A | 5/1993 | Hong et al. |
| 5,347,295 A | 9/1994 | Agulnick et al. |
| 5,398,310 A | 3/1995 | Tchao et al. |
| 5,504,482 A | 4/1996 | Schreder |
| 5,523,775 A | 6/1996 | Capps |
| 5,588,105 A | 12/1996 | Foster et al. |
| 5,612,719 A | 3/1997 | Beernink et al. |
| 5,644,317 A | 7/1997 | Weston et al. |
| 5,724,660 A | 3/1998 | Kauser et al. |
| 5,752,172 A | 5/1998 | Matero |
| 5,774,829 A | 6/1998 | Cisneros et al. |
| 5,913,170 A | 6/1999 | Wortham |
| 5,936,572 A | 8/1999 | Loomis et al. |
| 5,946,647 A | 8/1999 | Miller et al. |
| 5,982,324 A | 11/1999 | Watters et al. |
| 5,999,126 A | 12/1999 | Ito |
| 6,002,936 A | 12/1999 | Roel-Ng et al. |
| 6,011,973 A | 1/2000 | Valentine et al. |
| 6,078,818 A | 6/2000 | Kingdon et al. |
| 6,081,229 A | 6/2000 | Soliman et al. |
| 6,088,594 A | 7/2000 | Kingdon et al. |
| 6,097,336 A | 8/2000 | Stilp |
| 6,104,931 A | 8/2000 | Havinis et al. |
| 6,134,228 A | 10/2000 | Cedervall et al. |
| 6,181,253 B1 | 1/2001 | Eschenbach et al. |
| 6,236,365 B1 | 5/2001 | LeBlanc et al. |
| 6,252,543 B1 | 6/2001 | Camp |
| 6,295,454 B1 | 9/2001 | Havinis et al. |
| 6,317,083 B1 | 11/2001 | Johnson et al. |
| 6,321,092 B1 | 11/2001 | Fitch et al. |
| 6,343,254 B1 | 1/2002 | Kirk et al. |
| 6,348,894 B1 | 2/2002 | Lahti |
| 6,380,890 B1 | 4/2002 | Smith et al. |
| 6,408,178 B1 | 6/2002 | Wickstrom et al. |
| 6,427,077 B1 | 7/2002 | Alberth, Jr. et al. |
| 6,449,486 B1 | 9/2002 | Rao |
| 6,542,819 B1 | 4/2003 | Kovacs et al. |
| 6,553,308 B1 | 4/2003 | Uhlmann et al. |
| 6,603,431 B2 | 8/2003 | Talvitie et al. |
| 6,738,808 B1 | 5/2004 | Zellner et al. |
| 6,757,545 B2 | 6/2004 | Nowak et al. |
| 6,952,181 B2 | 10/2005 | Karr et al. |
| 6,999,779 B1 | 2/2006 | Hashimoto |
| 7,054,981 B2 | 5/2006 | Fadell et al. |
| 7,085,577 B1 | 8/2006 | Katsuno et al. |
| 7,162,367 B2 | 1/2007 | Lin et al. |
| 7,274,332 B1 | 9/2007 | Dupray |
| 7,380,116 B2 | 5/2008 | Hendry et al. |
| 7,421,486 B1 | 9/2008 | Parupudi et al. |
| 7,477,903 B2 | 1/2009 | Wilcock et al. |
| 7,483,944 B2 | 1/2009 | Parupudi et al. |
| 7,532,680 B2 | 5/2009 | Vayrynen et al. |
| 7,558,696 B2 * | 7/2009 | Vilppula ............... G01S 5/0257 342/357.31 |
| 7,747,704 B2 * | 6/2010 | Parupudi ........... G06F 17/30241 455/414.1 |
| 7,760,559 B2 | 7/2010 | Campbell et al. |
| 9,392,403 B2 | 7/2016 | Vilppula et al. |
| 2002/0175855 A1 | 11/2002 | Richton et al. |

FOREIGN PATENT DOCUMENTS

| | | |
|---|---|---|
| EP | 0763749 A1 | 3/1997 |
| EP | 0957370 A1 | 11/1999 |
| EP | 1227694 A1 | 7/2002 |
| EP | 2270533 A1 | 1/2011 |
| EP | 2270534 A1 | 1/2011 |
| EP | 1297352 B1 | 1/2016 |
| GB | 2322248 A | 8/1998 |
| JP | H0686477 A | 3/1994 |
| JP | H07162459 A | 6/1995 |
| JP | H095092 A | 1/1997 |
| JP | H09126786 A | 5/1997 |
| JP | H09152342 A | 6/1997 |
| JP | H10221427 A | 8/1998 |
| JP | H10281801 A | 10/1998 |
| JP | H1194923 A2 | 4/1999 |
| JP | H11161486 A | 6/1999 |
| JP | H11271073 A | 10/1999 |
| JP | H11282864 A | 10/1999 |
| JP | H11304904 A | 11/1999 |
| JP | 2000019238 A | 1/2000 |
| JP | 2000502802 A | 3/2000 |
| JP | 2000098017 A | 4/2000 |
| JP | 2000098018 A | 4/2000 |
| JP | 2000098034 A | 4/2000 |
| JP | 2000102058 A | 4/2000 |
| JP | 2000102060 A | 4/2000 |
| JP | 2000111648 A | 4/2000 |
| JP | 2000132797 A | 5/2000 |
| JP | 2000155163 A | 6/2000 |
| JP | 2004502942 A | 1/2004 |
| JP | 2011209298 A | 10/2011 |
| WO | 9724583 A1 | 7/1997 |
| WO | 9852379 A1 | 11/1998 |
| WO | 9902005 A1 | 1/1999 |
| WO | 9921389 A1 | 4/1999 |
| WO | 9927746 A1 | 6/1999 |
| WO | 9939258 A1 | 8/1999 |
| WO | 9946949 A1 | 9/1999 |
| WO | 9961934 A1 | 12/1999 |
| WO | 0027143 A1 | 5/2000 |
| WO | 0108339 A2 | 2/2001 |
| WO | 0161373 A1 | 8/2001 |
| WO | 0203093 A1 | 1/2002 |
| WO | 02082120 A1 | 10/2002 |
| WO | 03005750 A1 | 1/2003 |

OTHER PUBLICATIONS

Intel, "Intel PXA27x Processor Family, Electrical, Mechanical and Thermal Specification", Data sheet, 2005, 20 Pages.

(56) References Cited

OTHER PUBLICATIONS

"Invalidity Claim Chart for U.S. Pat. No. 7,558,696", Exhibit No. 5, Jul. 7, 2009, 290 Pages.
Kao, "Integration of GPS and Dead Reckoning Navigation Systems", Proceedings of the 1991 Vehicle Navigation and Information Conference (VNIS 1991), 1991, pp. 635-643.
Kupper et al, "From Location to Position Management: User Tracking for Location-based Services", Mobile and Distributed Systems Group, 2005, pp. 81-88.
Merriam-Webster, Inc., "Webster's 9th New Collegiate Dictionary", 1983, Excerpts of p. 763 (4 Pages).
Morris, "The American Heritage Dictionary of the English Language", 1976, Excerpts of pp. 361, 814 (4 Pages).
Volz et al., "NEXUS: The Development of a Platform for Location Aware Applications", Research Report, 2001, 10 Pages.
Nokia, "Nokia N8-00 User Guide", Issue 1.1, 2010, Excerpts of pp. 1, 9, 21-24, 34-36 (9 Pages).
Nokia, "Nokia N900 User Guide", Issue 1.3, 2010, Excerpts of pp. 1, 2, 16 and 24 (4 Pages).
"Nokia's Motion for Claim Construction", *Nokia Corporation* v. *Apple Inc.*, Civil Action No. 10-CV-249, In the United States District Court for The Western District of Wisconsin, Dec. 17, 2010, pp. 1-2.
"Nokia's Opening Markman Brief", *Nokia Corporation* v. *Apple Inc.*, Civil Action No. 10-CV-249, In the United States District Court for The Western District of Wisconsin, Dec. 17, 2010,130 Pages.
OSGI, "OSGi Service Gateway Specification", Open Services Gateway Initiative, Release 1.0, May 2000, pp. 1-189.
Drane et al., "Positioning GSM Telephones", IEEE Communications Magazine, vol. 36, No. 4, Apr. 1998, pp. 46-59.
Spreitzer et al., "Providing Location Information in a Ubiquitous Computing Environment", ACM, 1993, pp. 1-14.
Efstratiou et al., "Reflection: A Solution for Highly Adaptive Mobile Systems", Workshop on Reflective Middleware, Apr. 2000, http://www.comp.lancs.ac.uk/computing/rm2000/papers/17-hrioucosef.pdf, 2 Pages.
Swedberg, "Ericsson's Mobile Location Solution", Ericsson Review No. 4, 1999, pp. 214-221.
Davis et al., "U.S. Statutory Invention Registration", Registration No. H965, Sep. 3, 1991, 7 Pages.
Umlauft et al., "GPS Device-Driver Software Documentation", Institut fur Automation Abt fur Automatisierungssysteme, Oct. 1999, 33 Pages.
Virrantaus et al., "Developing GIS-Supported Location-Based Services", Proceedings of the Second International Conference on Web Information Systems Engineering, 2001, 10 Pages.
Wegdam et al., "User Location in Heterogeneous Mobile Networks", White Paper, Jan. 2004, 14 Pages.
Brazilian Office Action for related Brazilian Patent Application No. BR122015022086-6 dated Oct. 27, 2016, with English-language summary, 9 Pages.
Brazilian Office Action for related Brazilian Patent Application No. PI0112016-6 dated Feb. 23, 2015, with English-language summary, 4 Pages.
Brazilian Office Action for related Brazilian Patent Application No. PI0112016-6 dated Feb. 27, 2015 with English-language summary, 4 Pages.
Brazilian Office Action for related Brazilian Patent Application No. PI0112016-6 dated Oct. 26, 2016, with English-language summary, 6 Pages.
Canadian Office Action for related Canadian Patent Application No. 2,414,604 dated Feb. 16, 2010, pp. 1-4.
Canadian Office Action for related Canadian Patent Application No. 2,414,604 dated Feb. 29, 2012, pp. 1-5.
Canadian Office Action for related Canadian Patent Application No. 2,414,604 dated Jun. 22, 2011, pp. 1-3.
Chinese Office action for related Chinese Patent Application No. 01814717.8 dated May 19, 2006, pp. 1-20.
Decision of Refusal for related Japanese Patent Application No. JP2002-508101 dated Oct. 2, 2012, pp. 1-17.
European Office action for related European Patent Application No. 01960758.9-1248 dated Nov. 6, 2007, pp. 1-5.
European Office action for related European Patent Application No. 01960758.9-1248 dated Nov. 26, 2008, pp. 1-5.
European Office Action for related European Patent Application No. 01960758.9-1248 dated Sep. 2, 2011, pp. 1-9.
European Office Action for related European Patent Application No. 10184119.5-1248 dated Dec. 2, 2010, pp. 1-7.
European Office Action for related European Patent Application No. 10184119.5-1927 dated May 3, 2017, 10 Pages.
European Office Action for related European Patent Application No. 10184418.1-1248 dated Dec. 3, 2010, 10 Pages.
European Office Action for related European Patent Application No. 10184418.1-1927 dated May 3, 2017, 12 Pages.
Finnish Office action for related Finnish Patent Application No. FI20001576 dated Jan. 29, 2001, with English-language summary, pp. 1-4.
International Preliminary Examination Report on Patentability for International Application No. PCT/FI2001/00632 dated Sep. 23, 2002, pp. 1-13.
International Search Report for related International Application No. PCT/FI2001/00632 dated Nov. 12, 2001, pp. 1-6.
Japanese Office Action for related Japanese Patent Application No. 2002-508101 dated Feb. 22, 2011, pp. 1-4.
Japanese Office Action for related Japanese Patent Application No. 2002-508101 dated Nov. 10, 2009, 8 Pages.
Japanese Office Action for related Japanese Patent Application No. 2011-138317 dated Aug. 6 , 2013, 6 Pages.
Korean Office action for related Korean Patent Application No. 10-2002-7017923 dated Aug. 22, 2007, pp. 1-7.
United States Office action for related U.S. Appl. No. 09/897,004 dated Apr. 18, 2007, pp. 1-11.
United States Office action for related U.S. Appl. No. 09/897,004 dated Apr. 11, 2003, pp. 1-13.
United States Office action for related U.S. Appl. No. 09/897,004 dated Apr. 17, 2008, pp. 1-13.
United States Office action for related U.S. Appl. No. 09/897,004 dated Aug. 20, 2008, pp. 1-18.
United States Office action for related U.S. Appl. No. 09/897,004 dated Dec. 31, 2003, pp. 1-15.
United States Office action for related U.S. Appl. No. 09/897,004 dated Mar. 5, 2009, pp. 1-14.
United States Office action for related U.S. Appl. No. 09/897,004 dated Oct. 1, 2007, pp. 1-10.
"Apple Inc.'s Answer, Defenses, and Counterclaims", *Nokia Corporation* v. *Apple Inc.*, U.S. District Court CourtWestern District of Wisconsin, Civil Action No. 10-CV-249, filed Jun. 28, 2010, pp 1-28.
"Complaint for Patent Infringement", *Nokia Corporation* v. *Apple Inc.*, U.S. District Court—Western District of Wisconsin, Civil Action No. 10CV249, filed May 7, 2010, 13 Pages.
"Joint Preliminary Pretrial Conference Statement", *Nokia Corporation* v. *Apple Inc.*, U.S. District Court—Western District of Wisconsin, Civil Action No.10-CV-249, filed Jul. 29, 2010, pp. 1-12.
3GPP, "3rd Generation Partnership Project; Technical Specification Group Services and System Aspects; Location Services (LCS); Service Description, Stage 1", 3g TS 22.071 Version 4.0.0, TSG-SA Working Group 1 (Services) meeting #8, Apr. 10-14, 2000, 16 Pages.
3GPP, "3rd Generation Partnership Project; Technical Specification Group (TSG) RAN; Working Group 2 (Radio layer 2 and Radio layer 3)", Report on Location Services, TR 25.923 V1.1.0, TSGR2#6(99)717, Sophia-Antipolis, Aug. 16-20, 1999, 53 Pages.
Analog Devices, Inc., "Serial Digital Controlled Variable Gain Line Driver", AD8320 Datasheet, 1998, pp. 1-20.
"Apple Inc.'s Memorandun in Support of its Motion for Claim Construction of Certain Disputed Terms", *Nokia Corporation* v. *Apple Inc.*, Civil Action No. 10-CV-249, In the United States District Court for The Western District of Wisconsin, Dec. 17, 2010, 81 Pages.

(56) References Cited

OTHER PUBLICATIONS

"Apple Inc.'s Motion for Claim Construction of Certain Disputed Terms", *Nokia Corporation v. Apple Inc.*, Civil Action No. 10-CV-249, In the United States District Court for The Western District of Wisconsin, Dec. 17, 2010, 6 Pages.

"Apple Inc.'s Second Supplemental Objections and Responses to Nokia's First Set of Interrogatories (Interrogatory No. 2)", *Nokia Corporation v. Apple Inc.*, Civil Action No. 3:10-CV-249-wmc, In the United States District Court for The Western District of Wisconsin, Nov. 17, 2010, 26 Pages.

CML Semiconductor Products, "FX009A, Low-Noise Digitally Controlled Amplifier Array", Datasheet, Jul. 1994, 7 Pages.

"Declaration of Dr. David T. Blaauw", *Nokia Corporation v. Apple Inc.*, Civil Action No. 10-CV-249, In the United States District Court for The Western District of Wisconsin, Dec. 17, 2010, 42 Pages.

"Declaration of William C. Simpson", *Nokia Corporation v. Apple Inc.*, Civil Action No. 10-CV-249, In the United States District Court for The Western District of Wisconsin, Dec. 17, 2010, 9 Pages.

Oxford, "Excerpt : The Compact Edition of the Oxford English Dictionary", vol. 1, 1971, 3 Pages.

Fantou, "Urban Positioning with GPS: A Mobile Communications Field Measurement Application", GPS World, vol. 1, No. 7, Jul. 1993, 11 Pages.

Forum.Nokia, "Nokia N8-00 Device Details", Apr. 27, 2010, webpage, htttp:/lwww.forum.nokiaiDevices/Device_specifications/N8-00/, 5 Pages.

Forum.Nokia, "Nokia N900 Device Details", Aug. 27, 2009, webpage, http://www.forum.nokia.com/Devices/Device_specifications/N900, 3 Pages.

Helander et al., "Handbook of Human-Computer Interaction", Elsevier Science, 2nd Edition, 1997,4 Pages.

Hofmann-Wellenhof et al., "GPS: Theory and Practice", Springer, 2001, 408 Pages.

Hohl et al., "Next Century Challenges: Nexus—An Open Global Infrastructure for Spatial-Aware Applications", Proceedings of the 5th annual ACM/IEEE International Conference on Mobile Computing and Networking, Jan. 25, 1999, pp. 249-255.

Imielinski et al., "GPS-Based Geographic Addressing, Routing, and Resource Discovery", Communications of the ACM, vol. 42, No. 4, Apr. 1999, pp. 86-92.

\* cited by examiner

PORTABLE TERMINAL AND METHOD FOR POSITION DETERMINATION

PRIORITY CLAIM

This application is a continuation of, claims priority to, and the benefit of U.S. application Ser. No. 15/095,961, titled "METHOD AND DEVICE FOR POSITION DETERMINATION, filed Apr. 11, 2016, which is a continuation of and claims priority to U.S. application Ser. No. 14/982,219, titled "METHOD AND DEVICE FOR POSITION DETERMINATION, filed Dec. 25, 2015, which is a continuation of and claims priority to U.S. application Ser. No. 14/801,275, titled "METHOD AND DEVICE FOR POSITION DETERMINATION, filed Jul. 16, 2015, which is a continuation of and claims priority to U.S. application Ser. No. 12/476,378, titled "METHOD AND DEVICE FOR POSITION DETERMINATION, filed Jun. 2, 2009, which is a continuation of and claims priority to U.S. application Ser. No. 09/897,004, titled "METHOD AND DEVICE FOR POSITION DETERMINATION, filed Jul. 2, 2001, now U.S. Pat. No. 7,558,696, which claims priority to Finnish Application No. 20001576, filed Jun. 30, 2000, the disclosures of which are incorporated herein by reference in their entireties.

BACKGROUND

1. Field

The present invention relates to a method and device for the determination of position.

2. Brief Description of Related Developments

The integration of different positioning methods into portable terminal devices has made it possible for a user of such a terminal to determine his/her geographical position. The use of satellites for the determination of position has given rise to the global GPS navigation system (Global Positioning System). The evolution of mobile communication systems and mobile terminals has also given rise to other types of positioning method, for example the E-OTD (Enhanced Observed Timing Difference) system, which is based on the measurement of differences in reception times of signals sent by several base stations at a mobile terminal.

In the development of methods and devices for the determination of position, emphasis has so far been placed mainly on the interaction between one application used in the device and one positioning method. An example of this kind of device is a portable GPS navigation device, which enables a user of the device to determine his/her position using the Global Positioning System and to display positioning information including, for example longitude and latitude information, on a display of the device. Since the reliability of different positioning methods under different geographical conditions varies, the problems that this may cause to the user of the device have been solved by enabling more than one positioning method to be used in a single terminal. In this way, the most suitable positioning method for any given situation can be used e.g. by selecting the method to be used from more than one available alternative. For example, the GPS positioning system is particularly well suited for use when travelling by road in a vehicle. In locations where the reliability of the GPS system is not the best possible, such as inside buildings, other positioning methods that function better can be used, for instance the E-OTD or TOA (Time to Arrival) methods.

A method and a device of this kind are presented in patent publication GB 2 322 248 A, in which the terminal comprises a single positioning application, capable of using several different positioning systems and changing the positioning method automatically if the positioning method in question becomes inoperative. In GB 2 322 248, the application using the positioning data provided by the various positioning methods, only provides the user with information that relates to the determination of position. In other words, the application only makes limited use of the positioning data. In the future, however, as applications further develop and diversify, different applications in mobile terminals will utilise positioning information to an increasing extent and in more complex and varied ways, not limited to the straightforward presentation of positioning-related information, to the user of the device. It is likely that a single terminal will comprise several applications and services utilising positioning information as well as several available positioning methods. For example, it is likely that future mobile terminals, for example, those developed in connection with 3rd generation mobile communication networks, will provide far more varied positioning-based applications than currently available. These applications may include, for example, navigation systems incorporating map-based displays for tracking the user's position, or applications designed to locate a particular type of service or retail outlet closest to the user's current location.

As the number of applications in a mobile terminal that require access to positioning data increases and the number of different positioning methods to which an application may have access also increases, a need will arise to manage and control the use of the positioning methods by the applications in an efficient manner. The need for efficient control of the positioning methods by the applications will become even more important as the complexity of the positioning-related tasks performed by the applications increases.

SUMMARY

Now, a method and a device for the determination of position has been invented, by means of which positioning methods integrated in and connectable to a terminal device, or provided by a mobile communication network, for example, can be used by more than one application with the aid of a positioning method selection device (PMSD). By means of the invention, one or more application can either simultaneously or at different times obtain and use positioning data provided by one or more positioning method via the PMSD.

At any given time, the PMSD can automatically determine the best possible positioning method available for use by the terminal's applications, based on requirements specifying the quality of service (Quality of Positioning, QoP) defined by the user or the application, without having to know the behaviour of the available positioning methods under different conditions. By using a positioning method selection device according to the invention, the number of tasks to be performed by the applications in use decreases, because each application requests positioning data in a centralised way, from the positioning method selection device, not from each positioning method separately. Thus, the PMSD functions as an interface between the applications and the positioning methods which manages and controls the use of the various positioning methods by the applications and ensures that the positioning data provided corresponds as closely as possible with the quality requirements specified by the user and/or application.

In a method according to the invention, each available application in the terminal sends a positioning request to the positioning method selection device when it requires positioning information. The PMSD knows the number of positioning methods available at any given time and their operating state at that time (e.g. in use/not in use) as well as their performance under the prevailing conditions. The applications do not have to know which positioning method is used at a particular time or how and in which format each positioning method provides the positioning data requested by the application.

Particularly, but not necessarily, when a terminal device is used for personal position determination, for example like a GPS locator, in such a way that the user attempts to determine his/her location with the aid of the terminal device, the PMSD can take into account user conditions, such as the order of preference of the different positioning methods, i.e. which positioning method the user wishes to use as first choice, provided that the positioning method in question is available for use. Furthermore, the user can define which positioning methods he/she wishes the PMSD to use at a particular time by allowing or forbidding the use of certain positioning methods. The user can specify conditions relating to the selection of the positioning methods directly to the PMSD (independent of the application) via a user interface, rather than via the application he/she is using. This advantageous feature reduces and simplifies the exchange of information between the applications and the PMSD. The conditions set by the user relating to selection of a positioning method can also comprise the desired accuracy of the requested positioning data (e.g. longitudes, latitudes, distance from a given point). Since each positioning method has its own characteristic performance and properties, the PMSD is capable of selecting a certain positioning method for use in connection with a positioning request from a particular application in accordance with the task to be performed by the particular application.

Settings performed in a centralised manner for the PMSD affect all applications directly, so the user does not have to perform the settings for each application separately. When a service, to which a connection has been made e.g. by means of a WAP (Wireless Application Protocol) or other browser, requests the browser to provide information relating to its location with a certain accuracy, the location information is ultimately expressed according to the conditions set by the user. For example, the browser application will not communicate location information to the service if the user has stipulated positioning methods for use at that time which cannot provide positioning data with the accuracy requested by the application. Alternatively, the user can define in advance the positioning methods from which each particular application can receive location information from the PMSD. This is an advantageous feature, particularly if the cost of using a positioning method is based on the number of times positioning data is requested.

The PMSD can also detect positioning methods connected via the terminal device which are taken into use or removed from use. For example, when the terminal device is used in a car, the user can connect the terminal to the car's navigation system, such as a GPS system, via a serial port or other equivalent port or connector. In this way, it is possible to make use of the car's own positioning system, which is possibly more accurate and versatile (e.g. providing map data and other information on road networks) than the terminal's internal GPS locator. Alternatively, the car's system can be used if the terminal does not have an internal GPS device.

On arrival at his/her destination by car, the user takes the terminal with him/her, whereupon the external GPS system is no longer available for use by the PMSD, and the PMSD searches for the most suitable method from the available positioning methods, or that defined in advance by the user, for example the internal GPS device of the terminal. When the user enters a building, the terminal's internal GPS receiver may enter a environment where it is not able to receive the necessary satellite signals (a so-called dead region), in which case its operation is prevented. In this situation, the PMSD searches once more among the available positioning methods for a new system, such as the E-OTD or Bluetooth system or WLAN services, which operate better indoors. In other words, the PMSD automatically registers which positioning devices/methods are available for use. External positioning devices can be detected, for example, on the basis of connections to the terminal's connectors or in other equivalent ways known in the art. Applications can also inform the PMSD of their requirements automatically.

According to a first aspect of the invention, there is provided a method for the determination of position using one or more positioning method, wherein a positioning method selection device is provided for centrally managing the use of said one or more positioning method.

Advantageously, a method according to the first aspect of the invention comprises the steps of:

maintaining a centralised register on at least one positioning property of said one or more positioning method;

maintaining a centralised register comprising at least one specified condition for selecting a positioning method;

allowing one or more application program to send a positioning request; and selecting a positioning method for use that fulfils at least one specified condition for selecting a positioning method.

According to a second aspect of the invention, there is provided a device for the determination of position using one or more positioning method, comprising a positioning method selection device for centrally managing the use of said one or more positioning method.

Advantageously, a device according the second aspect of the invention comprises:

first maintaining means for maintaining a centralised register on at least one positioning property of said one or more positioning method;

second maintaining means for maintaining a centralised register on at least one specified condition for selecting a positioning method;

means for allowing a positioning request to be sent by one or more application program;

selection means for selecting a positioning method for use that fulfils at least one specified condition for selecting a positioning method.

According to a third aspect of the invention, there is provided a computer program product for the determination of position using one or more positioning method, comprising computer program means implementing a positioning method selection device for centrally managing the use of said one or more positioning method.

Advantageously, a computer program product according to the third aspect of the invention comprises:

computer program means for maintaining a first centralised register on at least one positioning property of said one or more positioning method;

computer program means for maintaining a second centralised register on at least one specified condition for selecting a positioning method;

computer program means for allowing a positioning request to be sent by one or more application program;

computer program means for selecting a positioning method for use that fulfils at least one specified condition for selecting a positioning method.

By means of the invention, one or more application can request the PMSD for positioning data in accordance with a parameter value (or values) indicating the quality of the positioning required, the PMSD using one or more positioning method to provide positioning data of the required quality to the application(s). The application (or applications) form the parameter value or values indicating the quality of the positioning required, and send it (them) to the PMSD, whereupon the PMSD is able to select the most suitable positioning method to provide the positioning data on the basis of the received parameter (or parameters) and provides the positioning data to the application (or applications) in the correct format, i.e. in a format requested by the application. The PMSD can 20 also form the positioning data by combining data from several positioning methods to achieve the best possible positioning accuracy.

The application can either form one parameter value, in which case accuracy can be a criterion, for example. Alternatively, it can form several parameters, in which case, in addition to accuracy, the parameter value (or parameter values) can be cost, if use of the positioning method is subject to a charge, or the speed at which the positioning method provides positioning data. It should be noted that the parameter values are not limited to the above examples, but other parameters can also be used.

The user can define conditions relating to the positioning methods, such as an order of preference and whether the user wishes a certain positioning method to be available for use or removed from use, directly to the PMSD. Because positioning methods are usually provided as commercial services and the cost of using the service incurred by the user is based on the number of times positioning data is requested, it is considerably more expensive if each application accesses the positioning methods independently. The method and device according to the invention therefore have the advantage of reducing the cost to the user of using positioning methods, as several applications can use positioning data already acquired by one application, via the PMSD.

BRIEF DESCRIPTION OF THE DRAWINGS

In the following, a system according to the invention will be described in greater detail with reference to drawings 1 to 8, in which.

DETAILED DESCRIPTION OF THE DISCLOSED EMBODIMENTS

Figure 1:
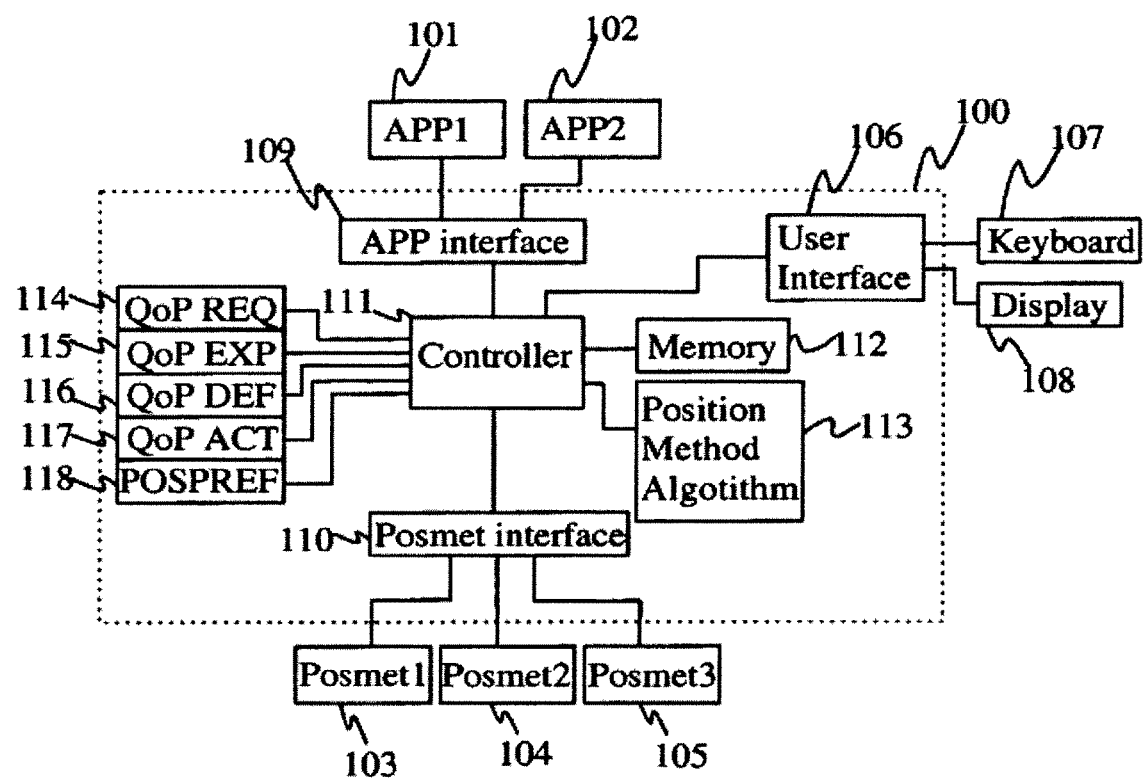
FIG. 1 illustrates a block diagram of a device according to the invention, in which a method for the selection of a positioning method according to the invention is implemented.

FIG. 1 illustrates a block diagram of an exemplary embodiment of a positioning method selection device PMSD (100) according to the invention. By way of example, two different applications 101 and 102, as well as three different positioning methods are presented; however, the number of applications and positioning methods is not limited to the previously mentioned numbers. Applications 101 and 102 request positioning data via the PMSD, which further uses information received from positioning methods 103 to 105 to form the positioning data. The user can define parameters relating to positioning tasks and the positioning methods, by means of a user interface 106 to 108. Said parameters are stored in a register 118.

The applications 101, 102 connect to the PMSD device via interface 109, by requesting the PMSD for positioning data. Applications 101 and 102 are able to define parameters relating to the positioning data requested, such as a required accuracy or the type and format of the positioning data, for example.

Positioning methods 103 to 105 are connected to the PMSD through an interface 110. The interface 110 can comprise, for example, a serial port or the like for the connection of an external positioning method, as well as interfaces for positioning methods integrated in the terminal and, for example, for positioning-related services provided by a mobile communication network.

Control means 111 to 113 control the operation of the various functional blocks of the PMSD as well as data transmission between them. The control means comprise a controller 111, which can be implemented, for example, as a microprocessor or equivalent means for controlling the functions of the PMSD. The control means further comprise a random access memory 112; as well as a permanent memory 113 for storing commands required for the control of the PMSD functions.

The parameter (or parameters) describing the quality of the positioning data (Quality of Position QoP), such as the positioning accuracy requested by application n, is stored in a register 114, where n indicates the application in use and is an integer between 1 and the maximum number of applications. Said parameter (or parameters) can be received directly from each application automatically, depending on the operating state of the application or, for example, when the application is installed in the terminal.

A parameter (or parameters) describing the quality of the positioning data provided by positioning method x is stored in register 115, where x indicates the positioning method in use and is an integer between 1 and the number of available positioning methods. This parameter (or parameters) represents an expected value, according to which an application can expect the PMSD to provide it with data. Said parameter (or parameters) can be provided directly from each positioning method automatically, being up-dated, for example, at given intervals, or when a particular positioning method is taken into use.

Default values for the parameters describing the quality of the positioning data provided by positioning method x are stored in register 116. The PMSD can obtain parameters describing the quality of the positioning data from the positioning methods at given intervals, or monitor the situation continuously and update the default values when needed. A default value is a parameter value according to which the positioning method is able to supply positioning data to the PMSD.

The value of the parameter (or parameters) describing the quality actually achieved by the positioning data provided by method x is stored in register 117, when said positioning method returns the positioning data requested by application n to the PMSD. In addition to the implementation shown in FIG. 1, the positioning method selection device can also be implemented as a computer program, in which case the functional blocks of the device are implemented as a program code.

Figure 2:
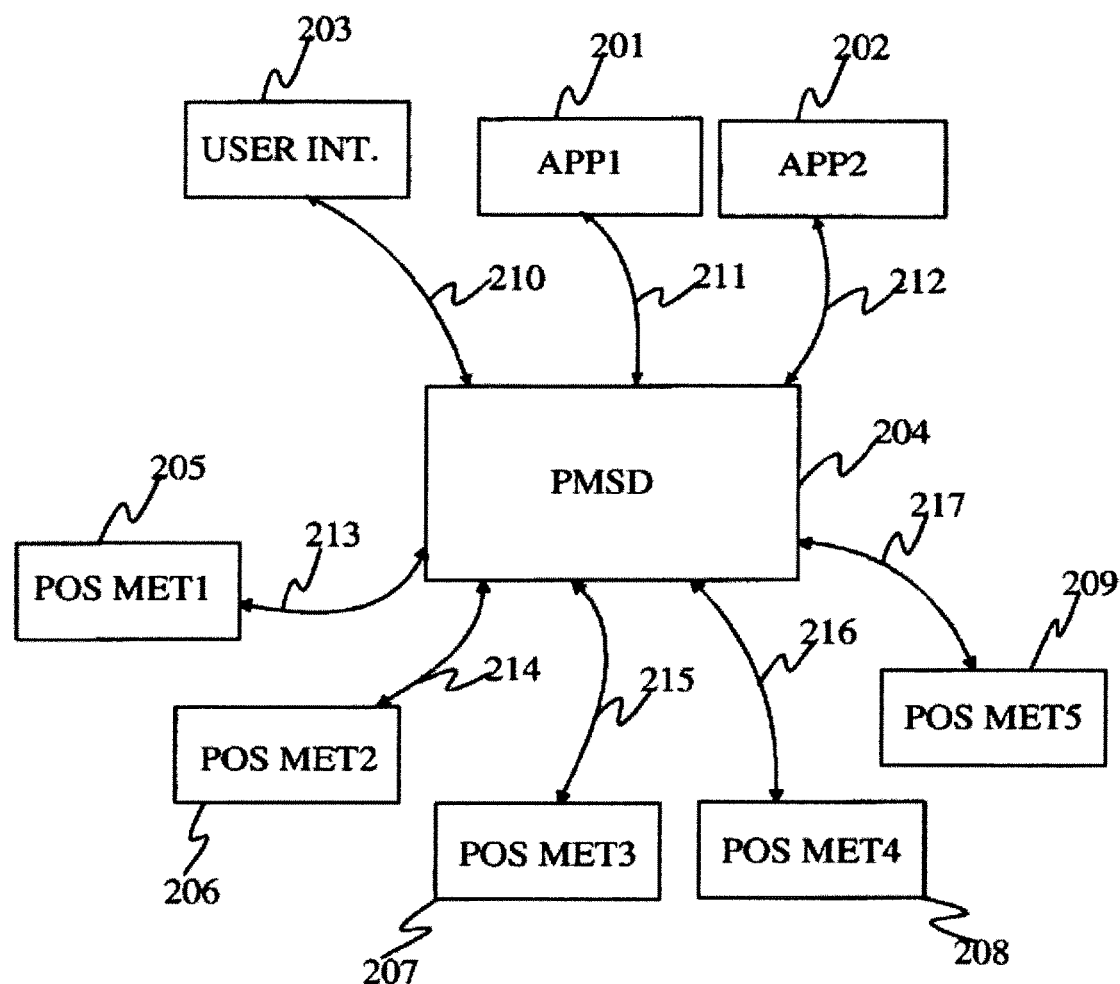
FIG. 2 illustrates interaction between positioning methods and applications, using a positioning method selection device according to the invention.

FIG. 2 illustrates the interaction between positioning methods and applications, 30 when using a positioning selection device (PMSD) according to the invention. By way of example, two different applications are shown, in this case a WAP browser 201 and a navigation guide 202, but other possible applications can also be used. Different positioning methods 205 to 209 are also shown, as well as a user interface 203, by means of which the user defines (ref 210) positioning-related parameters. The positioning methods may include for example, the GPS and/or E-OTD system described earlier. The user may also be provided with an option to enter positioning data, such as a street address, geographical coordinates (e.g. latitude and longitude) or the like, directly via the user interface, or to access stored positioning data from a database, for example a contact card or position of interest (POI) database.

The PMSD (204) receives (ref. 211, 212) positioning requests from applications 201, 202, and forms a response to said positioning requests from the data provided by positioning methods 205 to 209, or by the user via the user interface. The PMSD can also receive information about the positioning accuracy of the positioning request, as well as information on the type and format of the positioning data requested by the application in question. The positioning requests and parameter(s) relating to a given positioning task may be received by the PMSD in a "one-off" manner when a particular application requires positioning data, or may be received continuously in a sequence. This situation may arise, for example, if the application in question is intended to provide the user with an up-to-date estimate of his/her position as he/she moves from place to place.

The PMSD 204 is also responsible for monitoring the functionality of the various positioning methods 205 to 209 under the prevailing conditions, and to always use (ref 213 to 217) the most suitable positioning method to obtain the positioning data. When receiving repeated or continuous requests for positioning data from a given application, the PMSD can select an appropriate positioning method when it first receives a positioning request and use that method to supply positioning data in response to subsequent requests from the same application until the sequence of requests comes to an end. In an alternative embodiment of the invention, the PMSD makes use of its monitoring capability to select the best possible positioning method for each of the sequence of requests.

If positioning methods external to the terminal are also available, such as a GPS receiver of a car, the PMSD registers the possibility of using said external positioning methods, for example, by adding information about such external positioning methods to a list containing all available positioning methods. This list can be, for example, a preference list defined by the user, in which the new positioning method is set as the first-choice positioning method, for example. Correspondingly, when an external positioning method is removed from use by disconnecting an external positioning device from the mobile terminal, the PMSD removes said positioning method, for instance by deleting the data on said positioning method from the list of available positioning methods.

In an embodiment of the invention, the PMSD is further able to combine positioning data provided by more than one positioning method in order to achieve the positioning quality requested by a particular application. This may be done, for example, by receiving positioning data consecutively from more than one positioning method and combining the data in an appropriate manner to achieve the desired positioning quality. In an alternative embodiment, the PMSD may access previously stored positioning data obtained from any appropriate positioning method and combine that with newly received positioning data. In this embodiment, it is advantageous to associate a time-stamp with each positioning request, so that the most recently obtained positioning results can be selected for combination. A period of validity may also be defined for the positioning data, such that stored positioning data is deleted once its period of validity expires.

The user can define parameters relating to position determination directly to the PMSD 204 through the user interface 203 instead of giving definitions separately to each application 205 to 209. The user can define, for example, the accuracy with which applications 201, 202 receive positioning data or which positioning method 205 to 209 the user prefers to use as the first-choice positioning method. Depending on the application used, the parameter (or parameters) relating to position determination can also be provided automatically from the application in question, in so far as said application is capable doing of this. In this way, the task of the applications 201, 202 is simply to request positioning data from the PMSD 204. This means that they do not necessarily require any information about the operation of the various existing positioning systems 205 to 209 available to the PMSD or any other positioning systems that may be implemented in the future. When management of positioning methods is implemented in a centralised manner by the user and/or the applications acting directly on a PMSD, rather than in a decentralised way, separately for each positioning method, the applications' load in that respect can be decreased and some capacity can be diverted to other functions of the application. In some situations, it may nevertheless be advantageous to allow a particular application to select or use a positioning method directly. Thus, in an embodiment of the invention, it possible for any application to over-ride or disable the operation of the PMSD and to use any of the available positioning methods in a manner analogous to that known from prior art systems.

Figure 3:
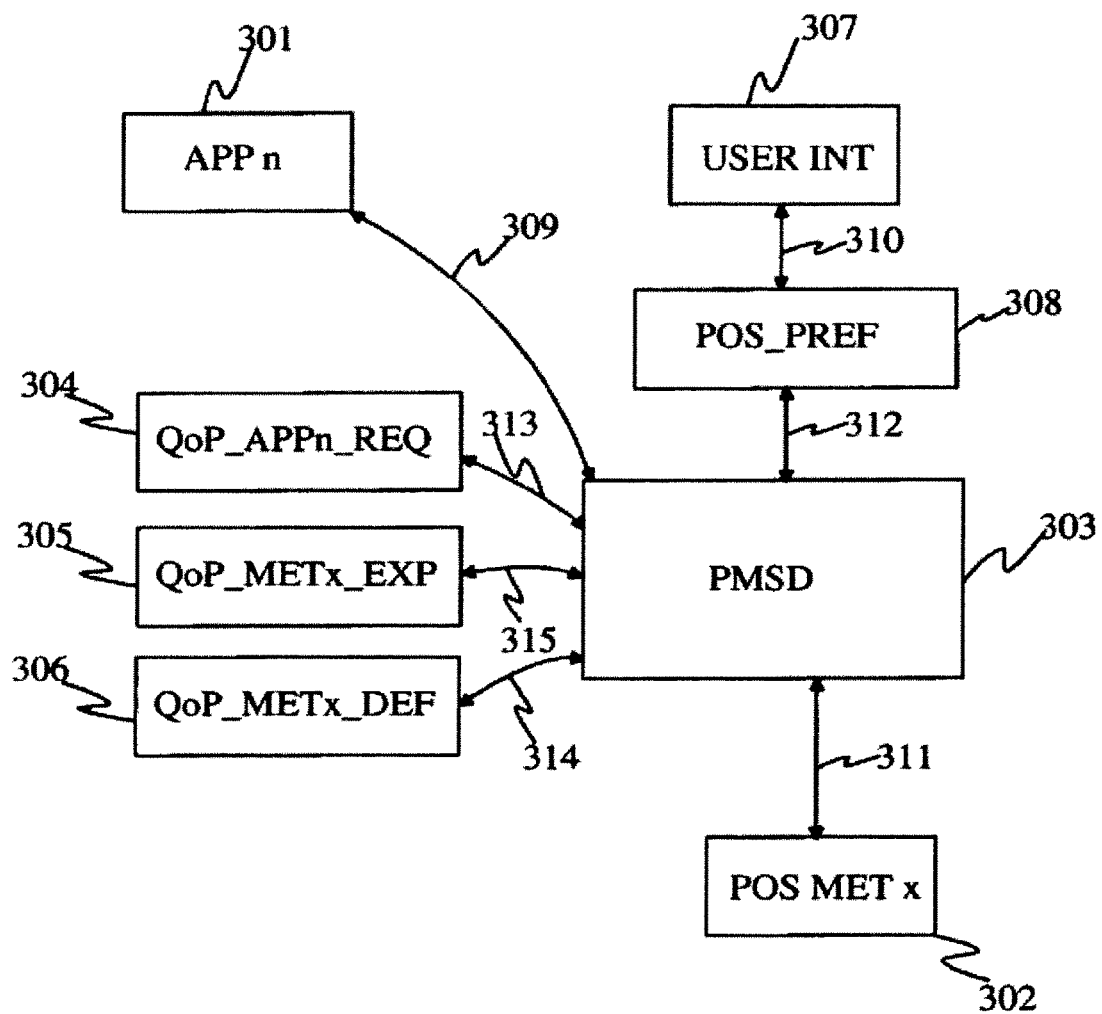
FIG. 3 presents a general description of a method according to the invention.

FIG. 3 illustrates the method according to the invention at a general level. The user can define parameters, which represent conditions on the basis of which a positioning method to be used is selected, through user interface 307. Said conditions can comprise, for instance, the positioning methods the user allows to be used by certain applications at a given time and the order in which the user prefers the positioning methods to be used. The parameters provided by the user are stored (ref 310) in register 308, from which the PMSD can retrieve them (ref. 312). Parameters defined by the user can also include positioning accuracy, positioning reliability, the interval with which positioning data is updated, or the time that is permitted to elapse before the first positioning data is provided after a positioning method is activated. Other kinds of parameters can also be used, in addition to those mentioned above.

Application n (ref 301), where n is an integer between 1 and the number of applications available, refers to the application in use at a particular moment, for example a WAP browser, which requests (ref. 309) the positioning method selection device (PMSD) 303 for positioning data. Parameters describing the quality of the positioning data requested by the application are sent (ref 309) from the application 301 to the PMSD 303 and are stored in register 304 to be used in connection with the positioning request. This can be done either once, for instance when a new application is installed in the terminal, or when an application is activated. It can also be done in connection with every positioning request or when the required quality of the positioning data changes. The parameters defined by the user and stored in register 308 can also be used when selecting a positioning method to be used.

Figure 4:
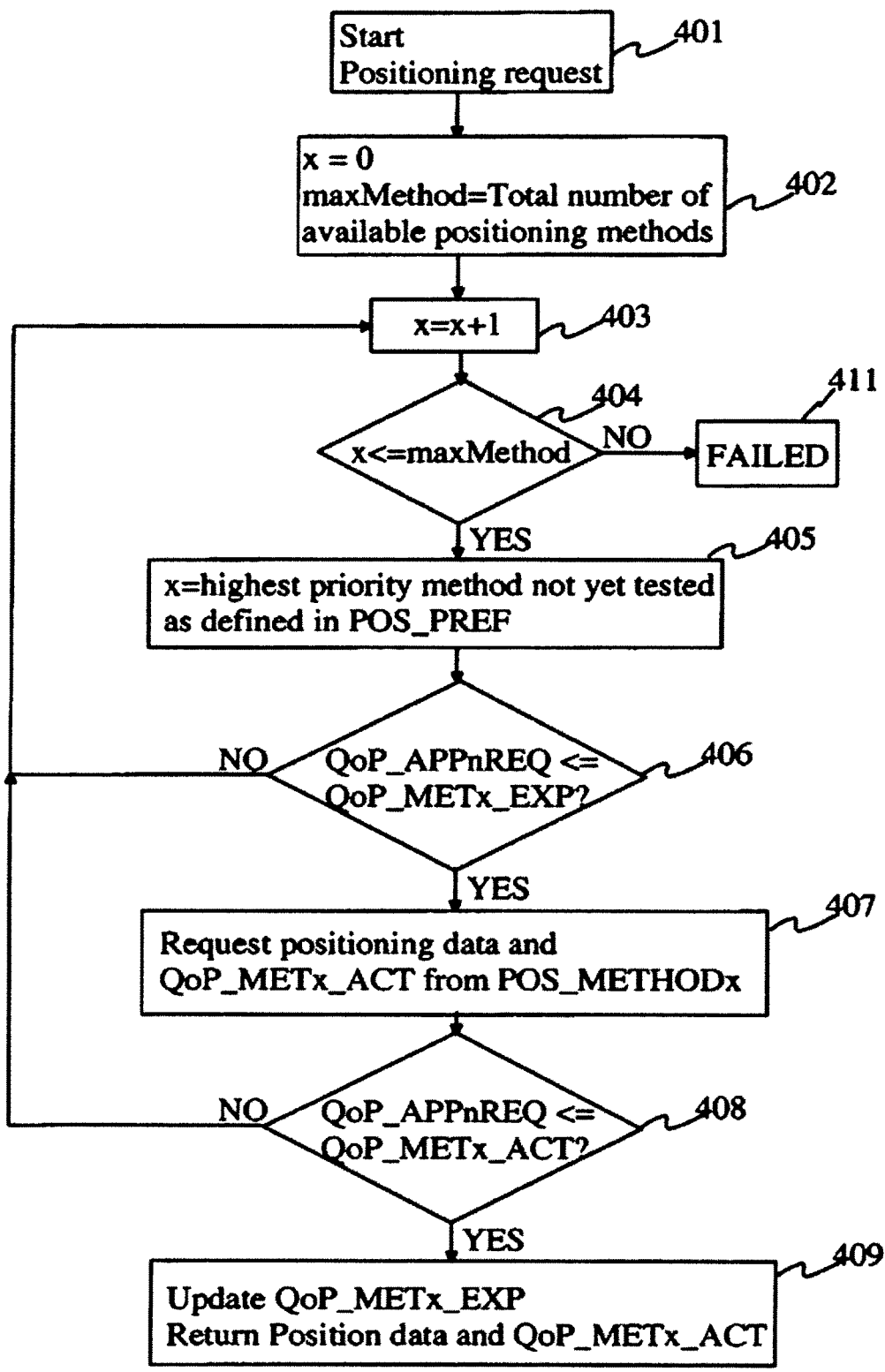
FIG. 4 presents a flow diagram showing the operation of a positioning method selection device according to the invention.

The PMSD 303 acquires (ref 311) data on the available positioning methods, as well as the positioning properties of the positioning methods. Next, the PMSD 1O 303 takes positioning method x into use (ref 302), where x denotes the positioning method in question and is an integer between 1 and the total number of available positioning methods. Default values for the parameters describing the quality of the positioning data provided by the positioning methods are stored in register 306 and, as previously described, these default values represent the quality with which the positioning methods are able to provide the PMSD with positioning data. The default values can be stored beforehand or updated when the positioning method 302 provides (ref 311) the PMSD with the first new value of a parameter (or parameters) under the prevailing conditions. The PMSD receives a new real-time parameter (or parameters) and stores (ref 315) it/them in register 305. The PMSD selects a positioning method with the aid of a decision-making algorithm, an exemplary embodiment of which is shown in FIG. 4. The algorithm operates in such a way as to select a positioning method whose parameter (or parameters) describing the quality of the positioning achieved by the positioning method and stored in register 305 correspond best with the parameter (or parameters) in register 304 that describe the quality of the positioning data required by the application that made the positioning request, in accordance with the conditions specified by the user.

The decision-making algorithm illustrated by FIG. 4 will now be described in detail. At step 401 an application sends the PMSD a positioning request whereupon, at step 402, the PMSD sets the value of variable x, which indicates the positioning method under consideration at a given time to zero, and sets the value maxMethod, which indicates the total number of positioning methods, to correspond with the total number of position methods available to the PMSD at that time. At step 403, the value of variable x is incremented and the method proceeds to step 404, where the value of variable x is examined to determine if it is smaller than or equal to the total number of positioning methods max-Method.

If the condition at step 404 is true and the value of x is less than or equal to the total number of positioning methods maxMethod, the method proceeds to step 405, where the highest priority positioning method in the order of preference defined by the user and/or application which is still untested is examined. The PMSD can monitor the number of available positioning methods and the operating state of each positioning method, or each method can be used in turn and, if a certain positioning method is not available at a particular moment, the next positioning method is selected for use.

Next, the method proceeds to step 406, where it is examined whether the value (or values) of the parameter (or parameters) QoP_APPn_REQ, which indicate the quality of the positioning data requested by application n, is greater than or equal to the expected value (or values) of the parameter (or parameters) QoP_METx_EXP, which describe the quality of the positioning data provided by positioning method x. The value of parameters QoP_APPn_REQ and QoP_METx_EXP may be a single value, more than one value, or an average of several values. If the value (or values) of the parameter (or parameters) provided by positioning method x is not equal to better than that requested by application n, the method returns to step 403, where the next possible available positioning method is examined and steps 403 to 406 are repeated until a positioning method is found which provides as its default value a value (or values) in accordance with the parameter (or parameters) which indicate the quality of the positioning data requested by application n.

At step 407, the positioning method POS-METHODx identified during steps 402 to 406 is requested for positioning data and the value (or values) QoP_METx_ACT of the parameter (or parameters) which describe the quality actually achieved by the positioning data provided by POS_METHODx. At step 407, the PMSD establishes a connection with said positioning method and receives the positioning data produced by the positioning method.

At the next step 408, it is examined whether the value (or values) of the parameter (or parameters) QoP_METx_ACT which describes the quality actually achieved by the positioning data provided by POS_METHODx is equal to or better than the value (or values) of the parameter (or parameters) QoP_APPn_REQ which indicate the quality of the positioning data requested by the application. If the parameter (or parameters) QoP_METx_ACT actually achieved is not equal to or better than the requested QoP_APPn_REQ parameter (or parameters), the method returns to step 403, where the variable indicating the positioning method to be considered is incremented once more. Subsequently, the next positioning method is tested at steps 404 to 408.

If the condition at step 404 is now false (i.e. x is not less than or equal to maxMethod), all positioning methods have been tested, and none of them achieves the specifications given to the PMSD by the user and/or application in question at that moment in time. In this case, the method proceeds to step 411, where several different actions may be taken depending on the implementation. The simplest implementation is to inform the application and/or user, via the application, that none of the available positioning methods can provide positioning data of sufficient quality at that moment. The PMSD can also provide the application with the result from the positioning method that was tested last (QoP_METx−1) together with its quality parameters, or the result and quality parameters from the method that gave the best result. In addition, the application can be provided with a notification to be transmitted to the user, possibly containing a warning that the quality requirement or requirements has/have not been met, and the QoP parameter or the QoP parameters whose requirement the positioning data did not fulfil.

In a third example implementation, the positioning data from the first positioning method (MET1) according to the order of priority defined by the user, together with its quality parameters (QoP) are returned to the application and a notification to be transmitted to the user is also returned to the application, which may contain a warning that the quality requirement or requirements has/have not been met, as well as the QoP parameter or parameters whose requirement the positioning did not fulfil.

The user can be informed of all results via the application, and can be requested to make a choice, which can be, for example, selection of a positioning method that best fulfils the application's positioning request, for instance on the basis of positioning accuracy, or other criteria. The application can also be provided with the positioning data together with the QoP parameters supplied by the positioning method whose result is closest in terms of QoP parameters to the requirements set by the application. For instance, if none of the positioning methods in use provides the accuracy required by the application, the PMSD can return the most accurate positioning result achieved. In this case, too, a notification to be transmitted to the user is returned to the application, which may contain a warning that the quality requirement or requirements has/have not been met, and the QoP parameter or parameters whose requirement the positioning data did not fulfil.

If the parameter or parameters which describe the quality of the positioning data actually achieved QoP_METx_ACT is/are equal to or better than the parameter value (or values) QoP_APPn_REQ requested by the application, the method proceeds to step 409, where the expected value (or expected values) QoP_METx_EXP is/are updated with QoP_METx_ACT, and the positioning data is returned to the application. The PMSD can update the expected value (or values) QoP_METx_EXP of the parameter (or parameters) relating to the positioning data of each positioning method continuously, for example at certain intervals. Updating the expected value is particularly advantageous when several applications use the same positioning method, in which case other applications not only receive the positioning data they request, but also get direct access to the expected value (or values) QoP_METx_EXP updated by the PMSD.

Figure 5:
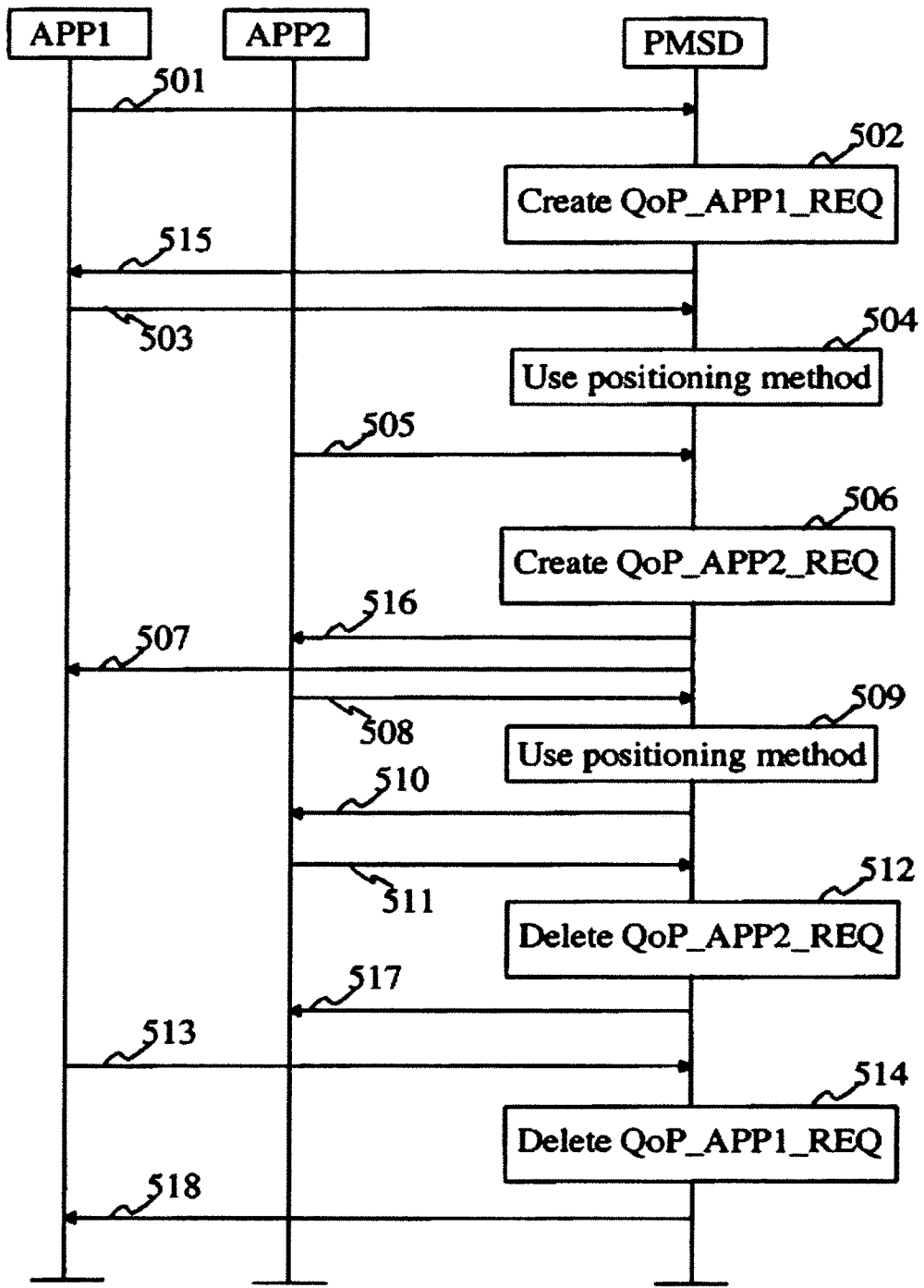
FIG. 5 presents a signaling diagram showing the interaction between two different applications and a positioning method selection device according to the invention.

FIG. 5 presents a signaling diagram showing the interaction between two different applications and a positioning method selection device PMSD according to the invention. By way of example, two different applications APP1 and APP2 are shown using the PMSD. First, at step 501, application APP1 establishes a connection to the PMSD. Then, at step 502, the PMSD generates a value (or values) QoP_APP1_REQ for the parameter (or parameters) which indicate the quality of the positioning data requested by the application. Advantageously, QoP_APP1_REQ is of a type required by the application in question. QoP_APP1_REQ is stored in register 304 of the PMSD, as can be seen from FIG. 3, and an acknowledgement (ref 515) that the parameter (or parameters) has/have been generated is sent to the application.

At step 503, application APP1 sends the PMSD a positioning request whereupon, at step 504, the PMSD executes the algorithm according to FIG. 4, in an attempt to find a positioning method which realises the parameter or parameters QoP_APP1_REQ which indicate the quality of the positioning data required by the application. Next, at step 505, application APP2 also establishes a connection to the PMSD whereupon, at step 506, the PMSD creates a parameter value (or values) QoP_APP2_REQ, which describes the quality of the positioning data requested by application APP2. At the same time, the PMSD sends an acknowledgement (ref. 516) indicating creation of the parameter or parameters to application APP2.

At step 507, the PMSD sends positioning data to application APP1. At the next step, 508, application APP2 sends a positioning request to the PMSD. If the parameter (or parameters) QoP_APP2_REQ which indicate the quality of the positioning data requested by application APP2 corresponds to the parameter (or parameters) QoP_APP1_REQ for application APP1, the PMSD can send the same positioning data to application APP2. In this case the PMSD does not have to examine different positioning methods, but can send the positioning data already produced to the application APP2 as well. If the positioning data sent to application APP1 cannot be sent to application APP2, for example as a result of different quality requirements, or if a different parameter (or parameters) has/have been defined for application APP2, the PMSD operates as it does at step 504. Next, at steps 511 and 513, application APP1 and application APP2 close their connections with the PMSD, whereupon the PMSD deletes the parameters QoP_APP1_REQ, step 512, and QoP_APP2_REQ, step 514, for said applications from its register and provides the applications with an acknowledgement that the parameters have been deleted, steps 517 and 518.

It should be noted that the order of the positioning requests made by applications APP1 and APP2 and the time taken for the requests can vary. Furthermore, in an alternative embodiment, said parameters are not deleted but are retained and may be used later, if needed. The PMSD can be provided with quality requirements when a new application is installed, and in this case it is not necessary to provide the PMSD with quality requirements in connection with every positioning request.

Figure 6:
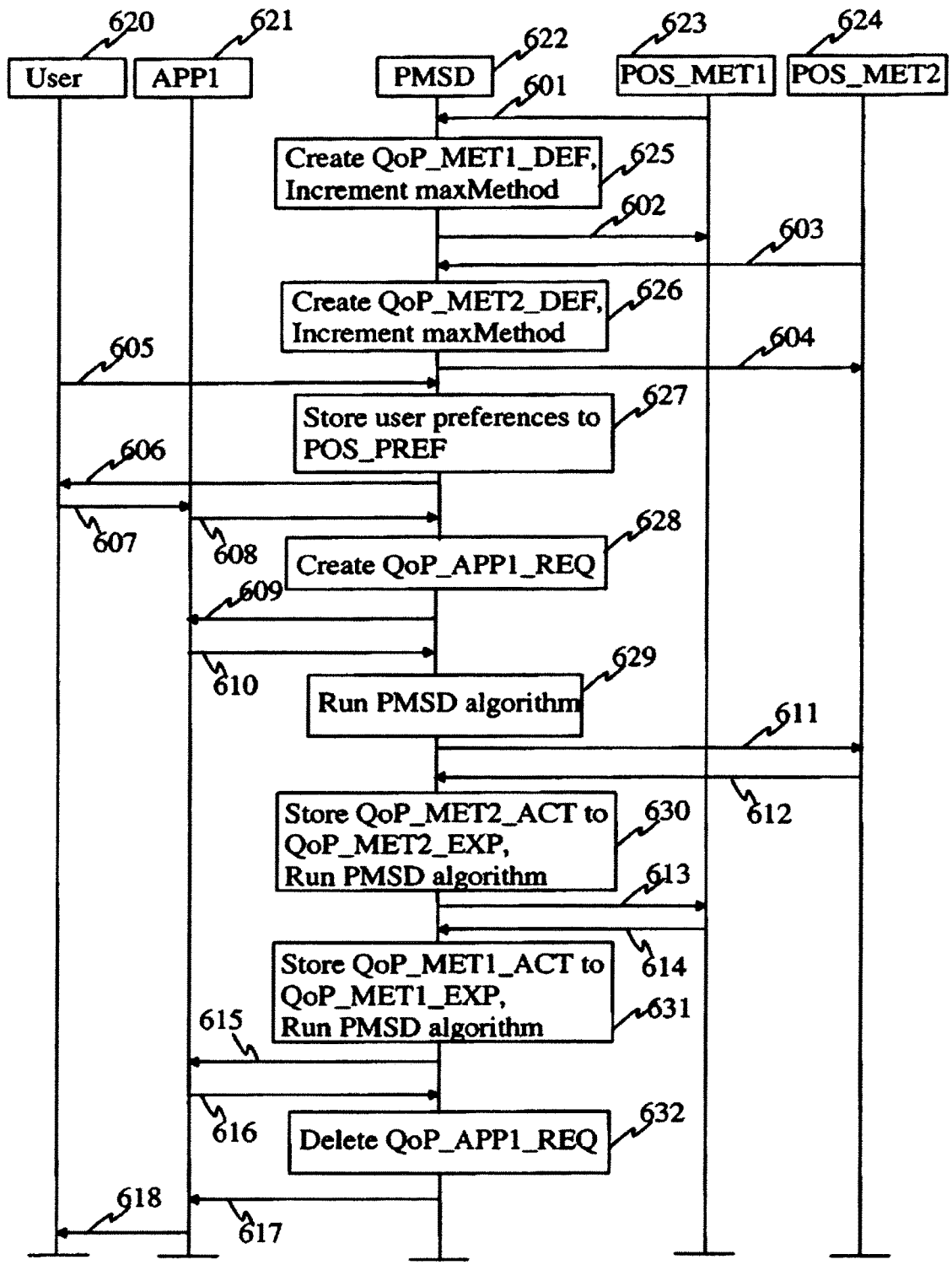
FIG. 6 presents a signalling diagram showing the operation of a device according to the invention when there are two different positioning methods in use.

FIG. 6 presents a signaling diagram showing the operation of a device according to the invention when there are two different positioning methods in use. By way of example, the PMSD device is shown using two different positioning methods POS_MET1, POS_MET2, of which the user has selected POS-MET2 as the first-choice positioning method. At step 601, positioning method POS-MET1 registers with the PMSD. Registration may take place, for example, when an external GPS system is connected to the terminal via a serial port, or in such a way that a positioning method that has been inoperative becomes operative, for example because the geographical conditions have improved, or a positioning method integrated in the terminal is activated. The PMSD creates a default value (or values) for the parameter (or parameters) QoP_MET1_DEF which describes the quality of the positioning data provided by the positioning method, step 625, and stores it in the register (ref 306 in FIG. 3), at the same time increasing by one the value of the variable maxMethod, which indicates the total number of available positioning methods. At step 602, the PMSD sends positioning method POS_MET1 an acknowledgement of its registration. At step 603, positioning method POS_MET2 registers, whereupon the PMSD creates a value (or values) for the parameter (or parameters) QoP_MET2_DEF, step 626, increases the value of maxMethod by one and sends an acknowledgement of the registration, step 604.

At step 605, the user defines settings for the positioning method parameters, such as an order of preference or the desired accuracy of the positioning data. Other quality criteria not mentioned herein may also be used. At step 627, the PMSD stores the user's settings in the register (ref 308 in FIG. 3) as the parameter (or parameters) POS-PREF and sends an acknowledgement to the user, step 606.

At step 607, the user activates application APP1 and application APP1 establishes a connection to the PMSD, step 608. At step 628, the PMSD creates a value (or values) QoP_APP1_REQ for the parameter (or parameters) indicating the quality of the positioning data required by application APP1, which can be, for example, a positioning accuracy automatically defined by application APP1, or a positioning accuracy defined by the user. At step 609, the PMSD provides application APP1 with an acknowledgement in response to establishment of the connection, after which application APPi makes a positioning request to the PMSD at step 610.

At step 629, the PMSD executes the algorithm according to FIG. 4. At step 611, the PMSD first sends a positioning request to positioning method POS_MET2, which the user has selected as the first-choice positioning method. At step 612, positioning method POS_MET2 sends the positioning data as well as the value (or values) of the parameter (or parameters) QoP_MET2_ACT actually achieved to the PMSD. At step 630, the PMSD stores the value of the parameter (or parameters) QoP_MET2_ACT actually achieved as the expected value (or values) QoP_MET2_EXP. The PMSD algorithm is executed again, whereupon the PMSD notices that the value (or values) of the parameter (or parameters) actually achieved are not equal to or better than those which the application or user defined as the value (or values) of the parameter (or parameters) QoP-APP1-REQ. Thus, the next positioning method in the order preference defined by the user, i.e. POS_MET1, is now tested.

At step 613, the PMSD sends a positioning request to positioning method POS-MET1, which sends the positioning data and the value (or values) of the parameter (or parameters) QoP_METI_ACT to the PMSD at step 614. At step 631, the PMSD stores the value (or values) of the parameter (or parameters) QoP_METI_ACT actually achieved as the expected value QoP_METI_EXP and the PMSD algorithm is executed. Now, the expected value (or values) QoP_METI_EXP is equal to or better than the value (or values) QoP_APP1_REQ defined for application APP1, whereupon at stage 615 the positioning data is sent to application APP1.

At step 616, the application terminates the connection to the PMSD, whereupon at step 632, the PMSD can delete the parameter (or parameters) QoP_APP1_REQ from its register and acknowledge that the connection has been terminated, step 617. At this point, application APP1 informs the user that the search for positioning data has been terminated, and the user can thus stop the application APP1 at step 618, if desired. Alternatively, application APP1 can continue running at step 616, but nevertheless informs the PMSD that it no longer requires positioning data at that time, whereupon application APP1 terminates its connection to the PMSD. When it requires positioning data again, application APP1 registers with the PMSD once more, for as long as required to receive the positioning data.

Figure 7:
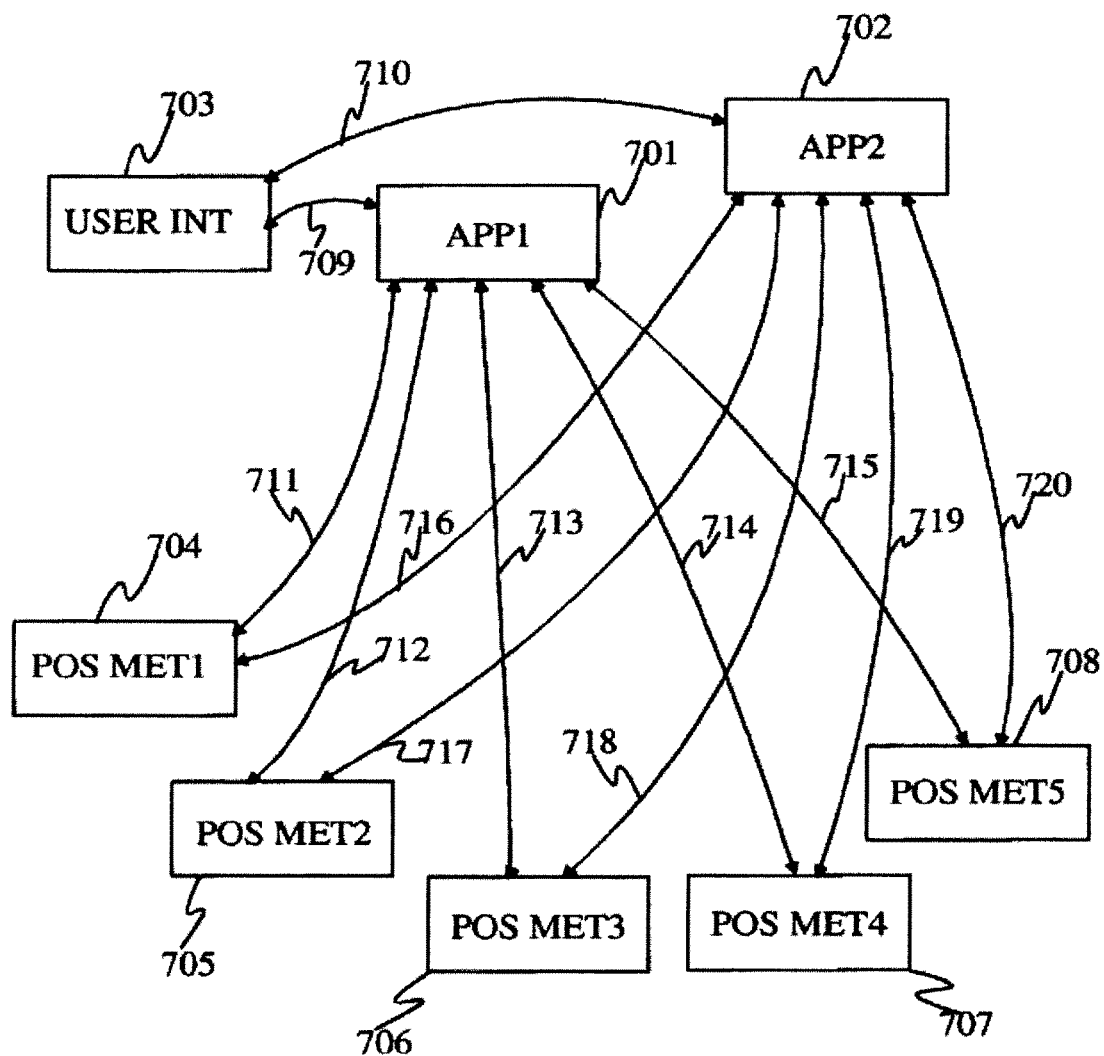
FIG. 7 illustrates interaction between positioning-based services and applications without a positioning method selection device according to the invention.

FIG. 7 shows an alternative implementation of a system comprising several applications and several positioning methods, implemented without a PMSD device. The system comprises two different applications which use the positioning methods, for example a WAP browser 701 and a navigation guide 702. It also comprises a user interface 703, with which the user can define (ref 109, 110) parameters and conditions relating to positioning tasks to be performed by the applications, and different positioning methods 704 to 708, including a GPS receiver 705 integrated in the terminal and, for example, an external GPS device 706 which can be connected to the terminal via a serial port. In this system, each application must be independently in communication with each available positioning method, must process the positioning data received from the positioning methods and choose which positioning method the application should use at a particular time. Furthermore, if the user also wishes to set conditions relating e.g. to the quality of the positioning data required by each application, they must be made for each application separately.

Figure 8:
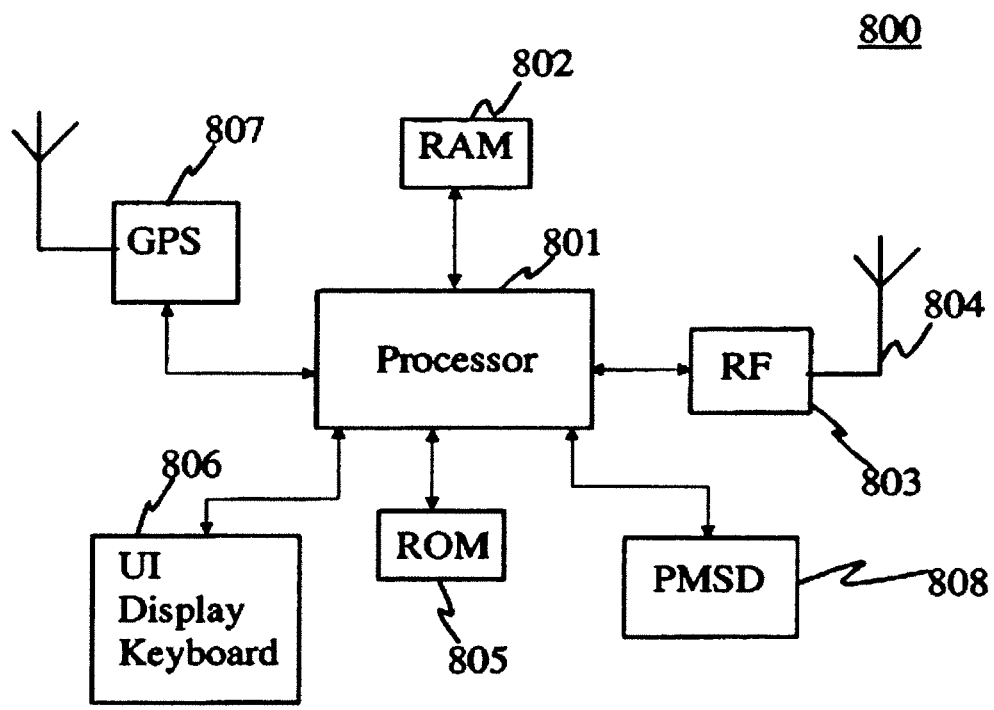
FIG. 8 presents a block diagram of a mobile terminal according to an embodiment of the invention.

FIG. 8 presents a block diagram of a mobile station 800 according to an embodiment of the invention. A processor 801 controls the various functional blocks involved in the operation of the mobile terminal: a random access memory 802 RAM, a radio frequency block RF 803, an antenna 804, a non-volatile or 1O read only memory 805 ROM, as well as a user interface UI 806 having at least a display and a keyboard. In FIG. 8, the mobile terminal 800 is also shown to include a GPS receiver 807 GPS. The processor's 801 operating instructions, that is program code corresponding to the mobile station's basic functions, is stored in the read-only memory 805 ROM and can be executed as required by the processor 801 e.g. under control of the user of the terminal. In accordance with the program code, the processor uses the RF block 803 to form a connection with a mobile communication network, enabling the mobile terminal 800 to transmit information to and receive information from the mobile communication network over a radio path.

In this example, the mobile terminal also comprises hardware and program code enabling it to use an E-OTD positioning method provided by the mobile communication network. It further comprises a positioning method selection device (PMSD) 808 implemented according to the present invention. The PMSD 808 receives requests for positioning data from applications running in the mobile terminal 800, for example a navigation system and/or a Web browser. According to program code stored in the ROM, and executed by the processor 801, the PMSD 808 monitors the operational state of the GPS receiver and the E-OTD positioning method. In accordance with the method previously described, the PMSD 808 provides the applications with positioning data that fulfils specified quality requirements and conditions. The PMSD 808 receives the quality requirements and conditions for the selection of the positioning methods from the applications and/or directly from the user via the user interface UI 806. The PMSD 808 uses the RAM 802 as a working memory to maintain the registers that store the various quality parameters and to perform comparisons between parameters describing the quality of positioning data requested and that actually achieved. The PMSD 808 also provides indications to the user via the display of the user interface UI 806, for example in a situation where neither the internal GPS receiver 807 nor the E-OTD positioning method can provide positioning data of sufficient quality to fulfil the requirements of the applications and/or user.

Implementations and embodiments of the invention have been described herein by of way of example. It is obvious to a person skilled in the art that the invention is not restricted to the details of the above-described embodiments and that the invention can be implemented in other forms without departing from the characteristics of the invention. The embodiments described should be regarded as illustrative, not restrictive. Thus, possibilities for the implementation and use of the invention are restricted only by the appended claims. Hence, different implementation alternatives for implementing the invention defined by the claims, including equivalent implementations, are included within the scope of the invention.

What is claimed is:

1. A portable terminal comprising:
a display;
a processor;
a memory; and
program code;
the memory and program code configured to, with the processor, cause the portable terminal to perform at least the following:
operate two or more application programs, each of the two or more application programs being executable on the portable terminal,
for the two or more application programs, centrally manage determining position utilizing two or more positioning methods, the two or more positioning methods comprising GPS and WLAN,
centrally manage receiving and responding to requests for positioning data from the two or more application programs,
centrally manage providing, in response to a request for positioning data from a particular one of the two or more application programs, positioning data fulfilling a quality requested by the particular one of the two or more application programs,
centrally manage providing positioning data obtained in connection with a request for positioning data from a first application program of the two or more application programs to the first application program, and
centrally manage providing the positioning data obtained in connection with the request for positioning data from the first application program to a second application program of the two or more application programs.

2. A portable terminal according to claim 1, wherein the portable terminal is a mobile terminal of a mobile communications network and wherein the portable terminal comprises a user interface, antenna, and GPS receiver.

3. A portable terminal according to claim 1, wherein the memory and the program code are further configured to, with the processor, cause the portable terminal to further perform the following:
centrally manage at least one positioning setting from a user of the portable terminal such that the at least one positioning setting is centrally applied as part of the portable terminal centrally managing receiving and responding to requests for positioning data from the two or more application programs,
wherein the centrally managing of the at least one positioning setting is such that the user does not have to put the at least one positioning setting in the two or more application programs separately.

4. A portable terminal according to claim 1, wherein the memory and the program code are further configured to, with the processor, cause the portable terminal to further perform the following:
implement at least one of the two or more positioning methods.

5. A portable terminal according to claim 1, wherein the memory and the program code are further configured to, with the processor, cause the portable terminal to further perform the following:
implement at least two of the two or more positioning methods.

6. A portable terminal according to claim 1, wherein the memory and the program code are further configured to, with the processor, cause the portable terminal to further perform the following:
determine whether the positioning data received from the two or more positioning methods fulfills the quality requested by the particular one of the two or more application programs.

7. A portable terminal according to claim 1, wherein the positioning data fulfilling the quality requested by the particular one of the two or more application programs can derive from a combination of positioning methods of the two or more positioning methods.

8. A portable terminal according to claim 1, wherein the positioning data requested by the particular one of the two or more application programs can derive from previously stored positioning data obtained from one of the two or more positioning methods and combined with newly received positioning data.

9. A portable terminal according to claim 1, wherein the memory and the program code are further configured to, with the processor, cause the portable terminal to further perform the following:
centrally manage selecting a positioning method of the two or more positioning methods for the particular one of the two or more application program which can provide the positioning data fulfilling the quality requested by the particular one of the two or more application programs.

10. A portable terminal according to claim 1, wherein the memory and the program code are further configured to, with the processor, cause the portable terminal to further perform the following:
centrally manage selecting a positioning method of the two or more positioning methods for the particular one of the two or more application programs which can provide the positioning data fulfilling the quality requested by the particular one of the two or more application programs,
wherein the positioning data provided to the particular one of the two or more application programs stems from the selected positioning method.

11. A portable terminal according to claim 1, wherein the memory and the program code are further configured to, with the processor, cause the portable terminal to further perform the following:
centrally manage maintaining a record of which of the two or more positioning methods is available for use by the two or more application programs,
centrally manage selecting a positioning method of the two or more positioning methods available for the particular one of the two or more application programs which can provide the positioning data fulfilling the quality requested by the particular one of the two or more application programs,
wherein the positioning method is selected from those one or more positioning methods of the two or more positioning methods that are, according to the record, available for use.

12. A portable terminal according to claim 1, wherein the memory and the program code are further configured to, with the processor, cause the portable terminal to further perform the following:

centrally manage receiving from a user of the portable terminal at least one condition that affects selection of a positioning method.

13. A portable terminal according to claim 1, wherein the memory and the program code are further configured to, with the processor, cause the portable terminal to further perform the following:
   centrally manage receiving at least one condition for a selection of a positioning method for use from at least one of the two or more application programs.

14. A portable terminal according to claim 1, wherein the memory and the program code are further configured to, with the processor, cause the portable terminal to further perform the following:
   centrally manage receiving at least one condition affecting a selection of a positioning method from a user of the portable terminal, and
   centrally managing the at least one condition affecting selection of a positioning method such that the portable terminal centrally applies the at least one condition affecting selection of a positioning method to handling requests for position data from the two or more application programs,
      wherein the central managing of the at least one condition affecting selection of a positioning method is such that the user does not have to put the at least one condition affecting selection of a positioning method in each of the two or more application programs separately.

15. A portable terminal according to claim 1, wherein the memory and the program code are further configured to, with the processor, cause the portable terminal to further perform the following:
   centrally manage receiving at least one condition affecting a selection of a positioning method from a user of the portable terminal, and
   centrally manage applying the at least one condition affecting a selection of a positioning method to handling of requests for positioning data from the two or more application programs,
      wherein the at least one condition affecting the selection of the positioning method comprises information relating to whether a certain positioning method is to be available for use or removed from use.

16. A portable terminal according to claim 1, wherein the memory and the program code are further configured to, with the processor, cause the portable terminal to further perform the following:
   centrally determine whether positioning data received from the two or more positioning methods fulfills the quality requested by the particular one of the two or more application programs,
   fulfill a request for positioning data from one of the two or more application programs by combining positioning data from more than one positioning method of the two or more positioning methods,
   centrally manage receiving at least one condition affecting a selection of a positioning method from a user of the portable terminal, and
   centrally manage applying the at least one condition affecting a selection of a positioning method to handling of requests for positioning data from the two or more application programs,
      wherein the centrally managing of the at least one condition affecting a selection of a positioning method is such that the user does not have to separately apply the at least one condition affecting a selection of a positioning method to each of the two or more application programs.

17. A portable terminal according to claim 1, wherein the memory and the program code are further configured to, with the processor, cause the portable terminal to further perform the following:
   fulfill the request for positioning data from the particular one of the two or more application programs by combining positioning data from more than one positioning method of the two or more positioning methods.

18. A portable terminal according to claim 1, wherein the positioning data provided by the portable terminal to the second application program fulfils a quality requested by the second application program.

19. A portable terminal according to claim 1, wherein the memory and the program code are further configured to, with the processor, cause the portable terminal to further perform the following:
   provide positioning data obtained in connection with the request for the positioning data from the first application program to the second application program if a quality requested by the second application program is met.

20. A portable terminal according to claim 1, wherein the memory and the program code are further configured to, with the processor, cause the portable terminal to further perform the following:
   determine whether positioning data received from the two or more positioning methods fulfills the quality requested by the particular one of the two or more application programs by examining whether one or more first values of one or more first parameters that describe a quality actually achieved by the positioning data received from the two or more positioning methods is equal to or better than one or more second values of one or more second parameters indicative of the quality requested by the particular one of the two or more application programs.

21. A portable terminal according to claim 1, wherein the memory and the program code are further configured to, with the processor, cause the portable terminal to further perform the following:
   determine whether an expected quality of positioning data provided by a positioning method of the two or more positioning methods satisfies the quality requested by the particular one of the two or more application programs,
   request and receive positioning data from a positioning method of the two or more positioning methods when an expected quality of the positioning data provided by the positioning method is determined to satisfy the quality requested by the particular one of the two or more application programs, and
   determine whether the positioning data received from the positioning method fulfills the quality requested by the particular one of the two or more application programs by determining whether an actual quality of the positioning data received from the positioning method satisfies the quality requested by the particular one of the two or more application programs.

22. A portable terminal according to claim 1, wherein the memory and the program code are further configured to, with the processor, cause the portable terminal to further perform the following:

determine whether an expected quality of positioning data provided by a positioning method satisfies the quality requested by the particular one of the two or more application programs.

23. A method for a portable terminal comprising:
the portable terminal performing at least the following:
operating two or more application programs, each of the two or more application programs being executable on a portable terminal;
for the two or more application programs, centrally managing determining position utilizing two or more positioning methods, the two or more positioning methods comprising GPS and WLAN;
centrally managing receiving and responding to requests for positioning data from the two or more application programs;
centrally managing providing, in response to a request for positioning data from a particular one of the two or more application programs, positioning data fulfilling a quality requested by the particular one of the two or more application programs;
centrally managing providing positioning data obtained in connection with a request for positioning data from a first application program of the two or more application programs to the first application program; and
centrally managing providing the positioning data obtained in connection with the request for positioning data from the first application program to a second application program of the two or more application programs.

24. A method according to claim 23, the method further comprising:
centrally managing at least one positioning setting from a user of the portable terminal such that the at least one positioning setting is centrally applied as part of the portable terminal centrally managing receiving and responding to requests for positioning data from the two or more application programs,
wherein the centrally managing of the at least one positioning setting is such that the user does not have to put the at least one positioning setting in the two or more application programs separately,
wherein the at least one positioning setting comprises at least one condition affecting a selection of a positioning method,
wherein the at least one condition affecting the selection of the positioning method comprises information relating to whether a certain positioning method is to be available for use or removed from use.

25. A method according to claim 24, the method further comprising:
centrally managing determining whether the positioning data received from the two or more positioning methods fulfills the quality requested by the particular one of the two or more application programs.

26. A portable terminal comprising:
a display;
a processor circuitry;
a memory; and
program code,
the memory and program code configured to, with the processor circuitry, cause the portable terminal to perform at least the following:
operate two or more application programs, each of the two or more application programs being executable on the portable terminal,
for the two or more application programs, centrally manage determining position utilizing two or more positioning methods, the two or more positioning methods comprising GPS and WLAN,
centrally manage receiving and responding to requests for positioning data from the two or more application programs,
centrally manage providing, in response to a request for positioning data from a particular one of the two or more application programs, positioning data fulfilling a quality requested by the particular one of the two or more application programs,
centrally manage providing positioning data obtained in connection with a request for positioning data from a first application program of the two or more application programs to the first application program, and
centrally manage providing the positioning data obtained in connection with the request for positioning data from the first application program to a second application program of the two or more application programs.

27. A portable terminal according to claim 26, wherein the memory and the program code are further configured to, with the processor circuitry, cause the portable terminal to further perform the following:
centrally manage at least one positioning setting from a user of the portable terminal such that the at least one positioning setting is centrally applied as part of the portable terminal centrally managing receiving and responding to requests for positioning data from the two or more application programs,
wherein the centrally managing of the at least one positioning setting is such that the user does not have to separately put the at least one positioning setting in each of the two or more application programs, and
wherein the at least one positioning setting from a user comprises at least one condition affecting a selection of a positioning method.

28. A portable terminal according to claim 27, wherein the memory and the program code are further configured to, with the processor circuitry, cause the portable terminal to further perform the following:
centrally determine whether the positioning data received from the two or more positioning methods fulfills the quality requested by the particular one of the two or more application programs.

29. A portable terminal comprising:
a display;
a microprocessor;
a memory; and
program code,
the memory and program code configured to, with the microprocessor, cause the portable terminal to perform at least the following:
operate two or more application programs, each of the two or more application programs being executable on the portable terminal,
for the two or more application programs, centrally manage determining position utilizing two or more positioning methods, the two or more positioning methods comprising GPS and WLAN,
centrally manage receiving and responding to requests for positioning data from the two or more application programs,
centrally manage providing, in response to a request for positioning data from a particular one of the two or more application programs, positioning data fulfilling a quality requested by the particular one of the two or more application programs, centrally manage providing positioning data obtained in connection with a request for positioning data from a first application program of the two or more application programs to the first application program, and centrally manage providing the positioning data obtained in connection with the request for positioning data from the first application program to a second application program of the two or more application programs.

30. A portable terminal according to claim 29, wherein the memory and the program code are further configured to, with the microprocessor, cause the portable terminal to further perform the following:

centrally determine whether positioning data received from the two or more positioning methods fulfills the quality requested by the particular one of the two or more application programs, fulfill a request for positioning data from one of the two or more application programs by combining positioning data from more than one positioning method of the two or more positioning methods, centrally manage receiving at least one condition affecting a selection of a positioning method from a user of the portable terminal, and centrally manage applying the at least one condition affecting a selection of a positioning method to handling of requests for positioning data from the two or more application programs, wherein the at least one condition affecting the selection of the positioning method comprises information relating to whether a certain positioning method is to be available for use or removed from use, wherein the centrally managing of the at least one condition affecting a selection of a positioning method is such that the user does not have to separately apply the at least one condition affecting a selection of a positioning method to each of the two or more application programs.

* * * * *